US007152089B2

(12) United States Patent
Harris

(10) Patent No.: US 7,152,089 B2
(45) Date of Patent: Dec. 19, 2006

(54) PARALLEL PREFIX NETWORKS THAT MAKE TRADEOFFS BETWEEN LOGIC LEVELS, FANOUT AND WIRING RACKS

(75) Inventor: David L. Harris, Claremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 655 days.

(21) Appl. No.: 10/431,036

(22) Filed: May 5, 2003

(65) Prior Publication Data

US 2004/0225706 A1   Nov. 11, 2004

(51) Int. Cl.
*G06F 7/50* (2006.01)
(52) U.S. Cl. ...................................... 708/710
(58) Field of Classification Search ............... 708/700
See application file for complete search history.

(56) References Cited

U.S. PATENT DOCUMENTS

| | | | | |
|---|---|---|---|---|
| 5,122,982 | A * | 6/1992 | Cohn ......................... | 708/710 |
| 6,529,931 | B1 * | 3/2003 | Besz et al. .................. | 708/711 |
| 6,539,413 | B1 * | 3/2003 | Goldovsky et al. ......... | 708/700 |
| 2002/0174158 | A1 * | 11/2002 | Sutherland et al. ......... | 708/710 |
| 2003/0061253 | A1 * | 3/2003 | Evans ........................ | 708/700 |

OTHER PUBLICATIONS

Publication entitled "Conditional-Sum Addition Logic", by J. Sklansky, IRE Transactions on Electronic Computers, Dec. 2, 1959, RCA Labs, Princeton, N.J., pp. 226-231.

Publication entitled "High-Speed Binary Adder", by Huey Ling, IBM J. Res Develop., vol. 25, No. 3, May 1981, May 1981, pp. 156-166.

Publication entitled "Parallel Prefix Computation", by Richard Ladner et al., Journal of the Ass. For Computing Machinery, vol. 27, No. 4, Oct. 1980, pp. 831-838.

Publication entitled "A Parallel Algorithm for the Efficient Solution of a General Class of Recurrence Equations", by Peter Kogge et al., IEEE Transactions on Computers, vol. C-22, No. 8, Aug. 1973, pp. 786-793.

Publication entitled "A Regular Layout for Parallel Adders", by Richard Brent et al., IEEE Transactions on Computers, vol. C-31, No. 3, Mar. 1982, pp. 260-264.

Publication entitled "Fast Area-Efficient VLSI Adders", by Tackdon Han et al., IEEE, 1987, pp. 49-56.

(Continued)

*Primary Examiner*—Tan V. Mai
(74) *Attorney, Agent, or Firm*—Park, Vaughan & Fleming, LLP

(57) ABSTRACT

A circuit that performs a prefix computation. This circuit includes an N-bit prefix network of prefix cells arranged into L+l logic levels, wherein the prefix network computes N outputs $\{Y_N, \ldots, Y_1\}$ from N inputs $\{X_N, \ldots, X_1\}$ using an associative two-input operator $\circ$, such that, $Y_1=X_1$, $Y_2=X_2 \circ X_1$, $Y_3=X_3 \circ X_2 \circ X_1$, . . . , and $Y_N=X_N \circ X_{N-1} \circ \ldots \circ X_2 \circ X_1$. Within this prefix network, each prefix cell has a fanout of at most $2^f+1$, and there are at most $2^t$ horizontal wiring tracks between each logic level. Additionally, l+f+t=L−1, and unlike existing prefix circuits, l>0, f>0, and t>0.

26 Claims, 8 Drawing Sheets

NEW 16-BIT (1,1,1) PREFIX NETWORK

OTHER PUBLICATIONS

Publication entitled "A New Architecture for an Automatic Generation of Fast Pipelined Adders", proceedings of 7$^{th}$ European Solid State Circuits Conference, Sep. 1991, pp. 101-104.

Publication entitled "A Family of Adders", by Simon Knowles, IEEE, 2001, pp. 277-284.

Publication entitled "Design of High-Performance CMOS Priority Encoders and Incrementer/Decrementers Using Multilevel Lookahead and Multilevel Folding Techniques", by Chung-Hsun Huang, IEEE Journal of Solid State Circuits, vol. 37, No. 1, Jan. 2002, pp. 63-75.

Publication entitled "Effect of Wire Delay on the Design of Prefix Adders in Deep-Submicron Technology", Zhijun Huang et al., University of California, Los Angeles, {zjhuang,milos}@cs.ucla.edu.

Publication entitled "Parallel Prefix Adder Design", by Andrew Beaumont-Smith et al., 2001 IEEE, pp. 218-225.

* cited by examiner

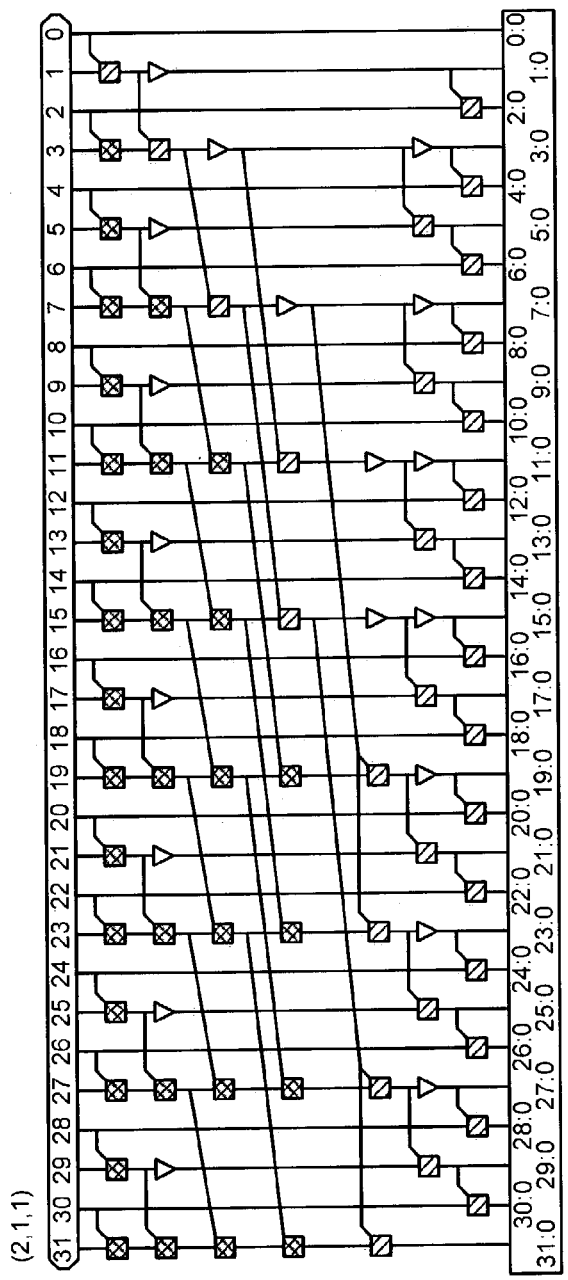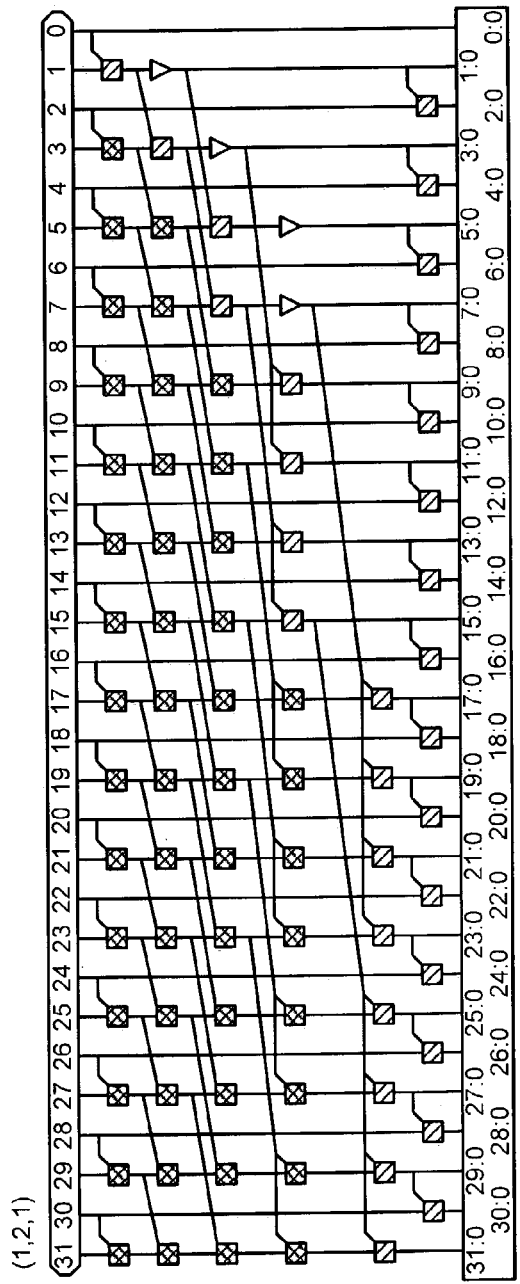
FIG. 5A
FIG. 5B

PARALLEL PREFIX NETWORKS THAT MAKE TRADEOFFS BETWEEN LOGIC LEVELS, FANOUT AND WIRING RACKS

BACKGROUND

1. Field of the Invention

The present invention relates to circuitry for performing computational operations. More specifically the present invention relates to designs for parallel prefix networks that perform prefix computations, wherein the designs make tradeoffs between number of logic levels, fanout, and number of horizontal wiring tracks between logic levels.

2. Related Art

In order to keep pace with continually increasing microprocessor clock speeds, computational circuitry within the microprocessor core must perform computational operations at increasingly faster rates. Parallel prefix networks are widely used to speed up such computational operations, for example in performing a high-speed addition operation.

A parallel prefix circuit computes N outputs $\{Y_N, \ldots, Y_1\}$ from N inputs $\{X_N, \ldots, X_1\}$ using an arbitrary associative two-input operator $\circ$ as follows $$Y_1 = X_1$$
$$Y_2 = X_2 \circ X_1$$
$$Y_3 = X_3 \circ X_2 \circ X_1$$
$$\vdots$$
$$Y_N = X_N \circ X_{N-1} \circ \ldots \circ X_2 \circ X_1$$
(1)

Common prefix computations include addition, incrementation, priority encoding, etc. Most prefix computations precompute intermediate variables $\{Z_{N:N}, \ldots, Z_{1:1}\}$ from the inputs. The prefix network combines these intermediate variables to form the prefixes $\{Z_{N:1}, \ldots, Z_{1:1}\}$. The outputs are postcomputed from the inputs and prefixes.

For example, adders take inputs $\{A_N, \ldots, A_1\}$, $\{B_N, \ldots, B_1\}$ and $C_{in}$ and produce a sum output $\{S_N, \ldots, S_1\}$ using intermediate generate (G) and propagate (P) prefix signals. The addition logic performs the following calculations, and an example of a corresponding 4-bit addition circuit is illustrated in FIG. 1.

Precomputation: $G_{i:i}=A_i \cdot B_i$ $G_{0:0}=C_{in} P_{i:i}=A_i \oplus B_i P_{0:0}=0$ (1)

Prefix: $G_{i:j}=G_{i:k}+P_{i:k} \cdot G_{k-1:j} P_{i:j}=P_{i:k} \cdot P_{k-1:j}$ (2)

Postcomputation: $S_i = P_i \oplus G_{i-1:0}$ (3)

A priority encoder may be structured similarly with different logic functions in each portion:

$X_{i:i}=\overline{A}_i$ bitwise precomputation $X_{i:j}=X_{i:k} \cdot X_{k-1:j}$ group logic (5)

$Y_i = A_i X_{i-1:1}$ output logic

There are many ways to perform the prefix computation. For example, serial-prefix structures such as ripple carry adders are compact but have a latency O(N). Single-level carry lookahead structures reduce this latency by a constant factor. More significantly, parallel prefix circuits use a tree network to reduce this latency to O(log N) and are widely used in fast adders, priority encoders, and other circuits that perform prefix computations. (Priority encoders are described in C. Huang, J. Wang, and Y. Huang, "Design of high-performance CMOS priority encoders and incrementer/decrementers using multilevel lookahead and multilevel folding techniques," IEEE J. Solid-State Circuits, vol. 37, no. 1, pp. 63–76, January 2002.)

Many parallel prefix networks have been described in the literature, especially in the context of addition. The classic networks include Sklansky (see J. Sklansky, "Conditional-sum addition logic," IRE Trans. Electronic Computers, vol. EC-9, pp. 226–231, June 1960.), Brent-Kung (see R. Brent and H. Kung, "A regular layout for parallel adders," IEEE Trans. Computers, vol. C-31, no. 3, pp. 260–264, March 1982.) and Kogge-Stone (see P. Kogge and H. Stone, "A parallel algorithm for the efficient solution of a general class of recurrence relations," IEEE Trans. Computers, vol. C-22, no. 8, pp. 786–793, August 1973.).

An ideal prefix network has $\log_2 N$ stages of logic, a fanout never exceeding 2 at each stage, and no more than one horizontal track of wire at each stage. The classic architectures of Brent-Kung, Sklansky, and Kogge-Stone deviate from this ideal with $2\log_2 N$ stages, fanout of N/2+1, and N/2 horizontal tracks, respectively. The Ladner-Fischer family of networks offers tradeoffs in fanout and stages between Sklansky and Brent-Kung (see R. Ladner and M. Fischer, "Parallel prefix computation," J. ACM, vol. 27, no. 4, pp. 831–838, October 1980.). Similarly, the Han-Carlson family of networks trades off stages and wiring between Brent-Kung and Kogge-Stone (see T. Han and D. Carlson, "Fast area-efficient VLSI adders," Proc. $8^{th}$ Symp. Comp. Arith., pp. 49–56, September 1987.). Finally, the Knowles family trades off fanout and wiring between Ladner-Fischer and Kogge-Stone (see [K01] S. Knowles, "A family of adders," Proc. $15^{th}$ IEEE Symp. Comp. Arith., pp. 277–281, June 2001.). The Kowalczuk-Tudor-Mlynek prefix network has also been proposed, but this network is serialized in the middle and hence is not as fast for wide adders (see J. Kowalczuk, S. Tudor, and D. Mlynek, "A new architecture for an automatic generation of fast pipeline adders," Proc. European Solid-State Circuits Conf., pp. 101–104, 1991.).

Parallel prefix networks are distinguished by the arrangement of prefix cells. FIGS. 2A–2G illustrate seven such networks for N=16. The upper box performs the precomputation and the lower box performs the postcomputation. In the middle, black cells (cross-hatched), gray cells (single-hatched), and white buffers comprise the prefix network. Black cells perform the full prefix operation, as given in equation (2). In certain cases (represented by gray cells), only part of the intermediate variable is required. For example, in many adder cells, only the $G_{i:0}$ signal is required, and the $P_{i:0}$ signal may be discarded. Such gray cells have lower input capacitance. White buffers are used to reduce the loading of later non-critical stages on the critical path. In FIGS. 2A–2G, the span of bits covered by each cell output is listed near the cell's output. Moreover, the critical path is indicated with a heavy line.

The prefix networks in FIGS. 2A–2G illustrate the tradeoffs in each network between number of logic levels, fanout, and horizontal wiring tracks. All three of these tradeoffs impact latency. For example, Huang and Ercegovac have shown that networks with large number of wiring tracks increase the wiring capacitance because the tracks are packed on a tight pitch to achieve reasonable area (see Z. Huang and M. Ercegovac, "Effect of wire delay on the design of prefix adders in deep submicron technology," Proc. $34^{th}$ Asilomar Conf. Signals, Systems, and Computers, vol. 2, pp. 1713–1717, 2000.).

Observe that the Brent-Kung, Han-Carlson, and Ladner-Fischer designs never have more than one black (cross-hatched) or gray (single-hatched) cell in each pair of bits on any given row. This suggests that the datapath layout may use half as many columns, which saves area and reduces wire length.

Also note that when the Knowles network is used for addition, propagate must be defined with an OR rather than an XOR. We can see this by considering the gray cell computing $G_{8:0} = G_{8:1} + P_{8:1}G_{1:0}$. If $A_1 = B_1 = 1$, the logic is correct for $P_1 = B_1$ but not for $P_1 = A_1 \oplus A_1 \oplus B_1$.

Although the above-described parallel prefix networks generally make reasonable tradeoffs between logic levels, fanout and number of horizontal wiring tracks between logic levels, they do not cover all possible points in the design space. Hence, they do not provide optimal parallel prefix networks under certain assumptions for relative costs between logic levels, fanout and wiring tracks.

SUMMARY

One embodiment of the present invention provides a circuit that performs a prefix computation. This circuit includes an N-bit ($N=2^L$) prefix network comprised of prefix cells arranged into L+1 logic levels, wherein the prefix network computes N outputs $\{Y_N, \ldots, Y_1\}$ from N inputs $\{X_N, \ldots, X_1\}$ using an associative two-input operator $\circ$, such that $Y_1 = X_1$, $Y_2 = X_2 \circ X_1$, $Y_3 = X_3 \circ X_2 \circ X_1$, ..., $Y_N = X_N \circ X_{N-1} \circ \ldots \circ X_2 \circ X_1$. Within this prefix network, each prefix cell has a fanout of at most $2^f + 1$, and there are at most $2^t$ horizontal wiring tracks between each logic level. Additionally, $l+f+t=L-1$, and unlike existing prefix networks $l>0$, $f>0$, and $t>0$.

In a variation on this embodiment, the N-bit prefix network is part of: an adder, a subtracter, a magnitude comparator, a priority encoder, or a circuit that finds the first two ones in an N-bit input.

In a variation on this embodiment, the N-bit prefix network functions as part of a 16-bit adder, wherein (l,f,t)=(1,1,1).

In a variation on this embodiment, the N-bit prefix network functions as part of a 32-bit adder, wherein (l,f,t)=(2,1,1), (1,2,1) or (2,1,1).

In a variation on this embodiment, the N-bit prefix network functions as part of a 64-bit adder, wherein (l,f,t)=(1,1,3), (1,2,2), (1,3,1), (2,1,2), (2,2,1) or (3,1,1).

In a variation on this embodiment, the N-bit prefix network functions as part of a 128-bit adder, wherein (l,f,t)= (1,1,4), (1,2,3), (1,3,2), (1,4,1), (2,1,3), (2,2,2), (2,3,1), (3,1,2), (3,2,1) or (4,1,1).

In a variation on this embodiment, precomputation operations are merged into the N-bit prefix network.

In a variation on this embodiment, the N-bit (l, f, t) prefix network is formed from an M-bit (0, f, t) Knowles network by adding l stages before and after the M-bit Knowles network, wherein $N=2^l M$, and wherein the prefix network has 2l+logM stages.

In a variation on this embodiment, logic levels in the prefix network include prefix cells that perform prefix operations, and buffers that reduce loading for subsequent logic levels.

One embodiment of the present invention provides a circuit that performs a prefix computation. This circuit includes an N-bit ($N=v^L$) prefix network comprised of prefix cells arranged into L+1 logic levels, wherein the prefix network computes N outputs $\{Y_N, \ldots, Y_1\}$ from N inputs $\{X_N, \ldots, X_1\}$ using an associative operator $\circ$, such that $Y_1 = X_1$, $Y_2 = X_2 \circ X_1$, $Y_3 = X_3 \circ X_2 \circ X_1$, ..., $Y_N = X_N \circ X_{N-1} \circ \ldots \circ X_2 \circ X_1$. In this prefix network, each prefix cell has a valency v and a fanout of at most $(v-1)v^f + 1$. Moreover, there are at most $(v-1)v^t$ horizontal wiring tracks between each logic level. Additionally, $l+f+t=L-1$, and unlike existing prefix networks $l>0$, $f>0$, and $t>0$.

BRIEF DESCRIPTION OF THE FIGURES

FIG. 5A illustrates a new 32-bit prefix network, wherein (l,f,t)=(2,1,1) in accordance with an embodiment of the present invention.
FIG. 5B illustrates a new 32-bit prefix network, wherein (l,f,t)=(1,2,1) in accordance with an embodiment of the present invention.

Table 1 presents a comparison of parallel prefix architectures in accordance with an embodiment of the present invention.

Table 2 illustrates how latency varies as a function of circuit size in accordance with an embodiment of the present invention.

Table 3 illustrates how latency varies based on circuit family in accordance with an embodiment of the present invention.

Table 4 illustrates how latency varies based on wire capacitance in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

New Taxonomy

Parallel prefix structures may be classified with a three-dimensional taxonomy (l,f,t) corresponding to the number of logic levels, fanout, and wiring tracks. For an N-bit parallel prefix structure with $L=\log_2 N$, the variables l, f, and t are integers in the range [0, L-1] indicating:

Logic Levels: L+l
Fanout: $2^f+1$
Wiring Tracks: $2^t$

Figure 3:
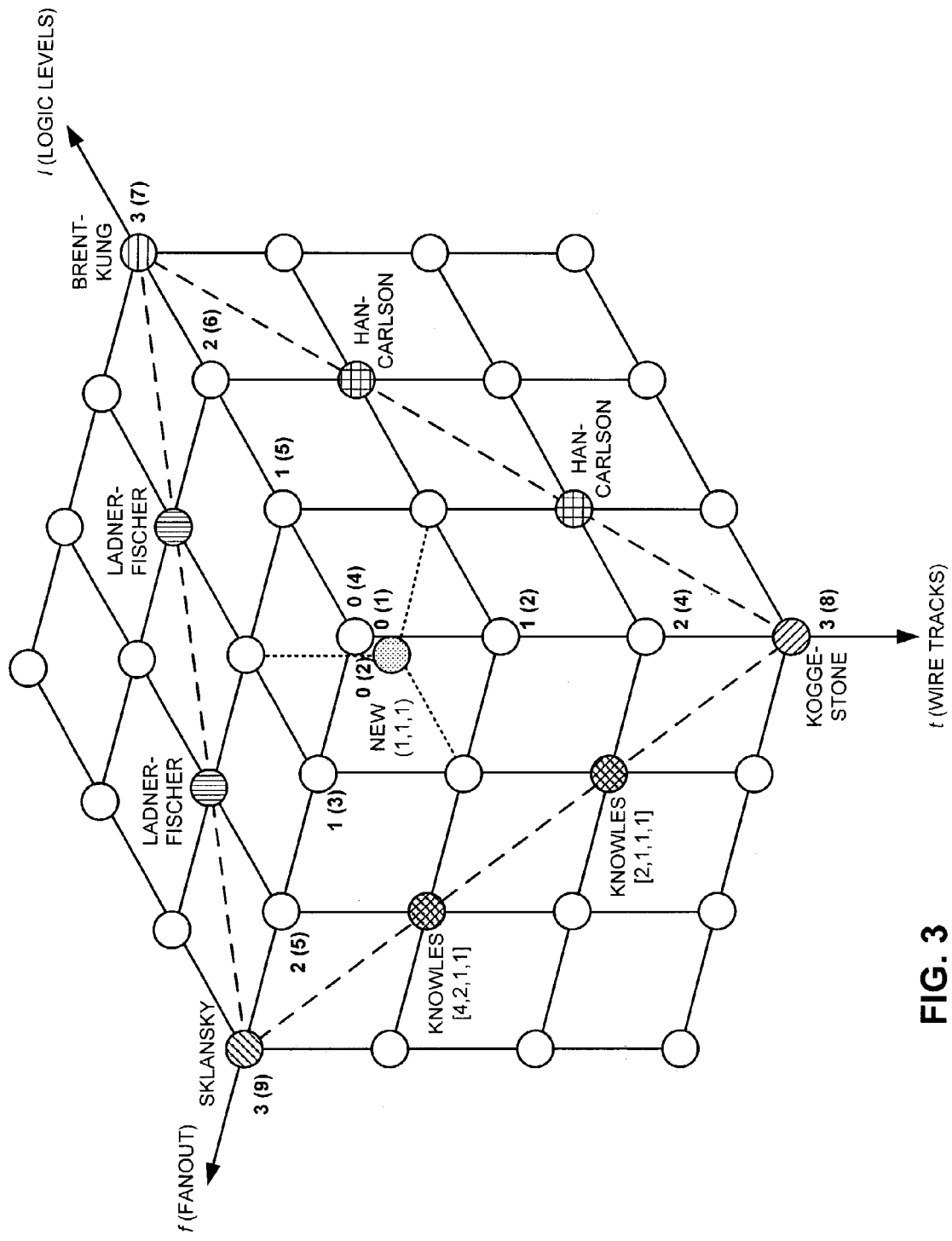
FIG. 3 illustrates a taxonomy of prefix networks in accordance with an embodiment of the present invention.

This taxonomy is illustrated in FIG. 3 for N=16. The number of logic levels, fanout, and wiring tracks are annotated along each axis in parentheses. The parallel prefix networks from the previous section all fall on the plane l+f+t=L−1, suggesting an inherent tradeoff between logic levels, fanout, and wiring tracks. The Brent-Kung (L−1,0,0), Sklansky (0,L−1,0), and Kogge-Stone (0,0,L−1) networks lay at the extremes. The Han-Carlson (1,0,L−2) network reduces the wiring tracks of the Kogge-Stone network by nearly a factor of two at the expense of an extra level of logic. In general, Han and Carlson describe a family of networks along the diagonal (l, 0, t) with l+t=L−1. Similarly, the Knowles family of networks occupy the diagonal (0,f,t) with f+t=L−1 and the Ladner-Fischer family occupy the diagonal (l,f,0) with l+f=L−1.

Figure 2A:
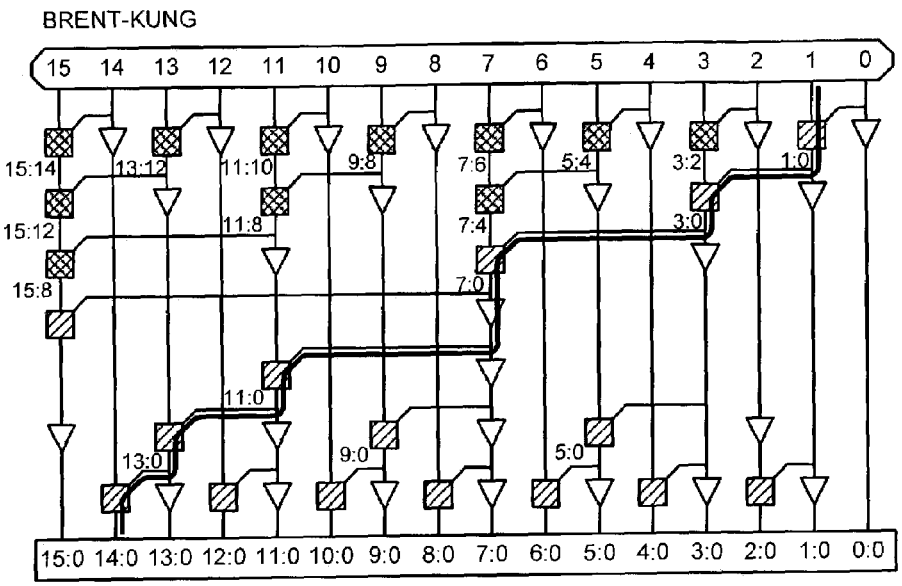
FIG. 2A illustrates a Brent-Kung prefix network.
Figure 2B:
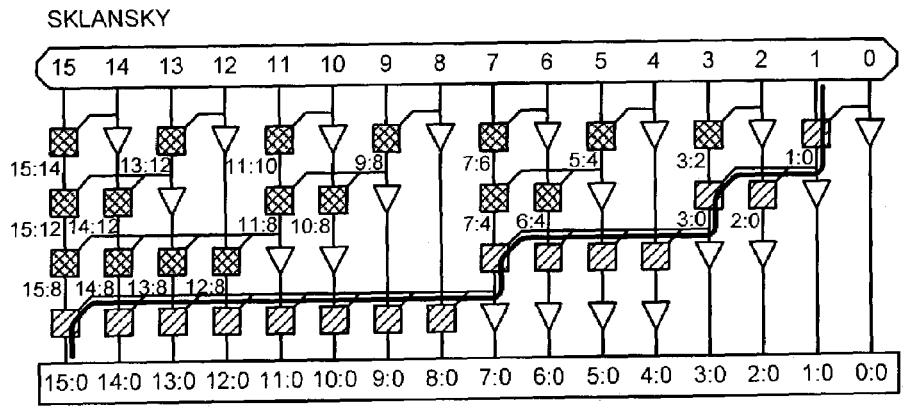
FIG. 2B illustrates a Sklansky prefix network.
Figure 2C:
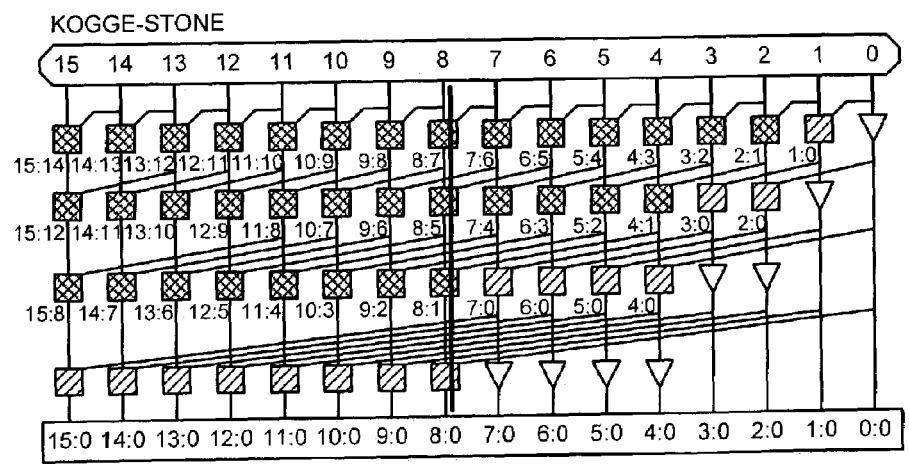
FIG. 2C illustrates a Kogge-Stone prefix network.
Figure 2D:
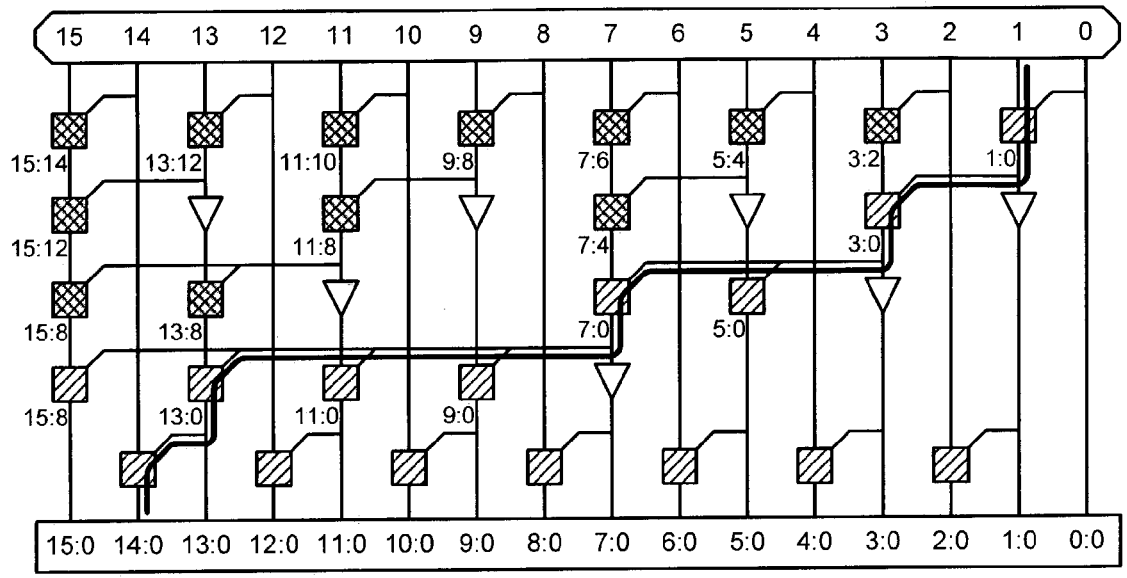
FIG. 2D illustrates a Ladner-Fischer prefix network.
Figure 2E:
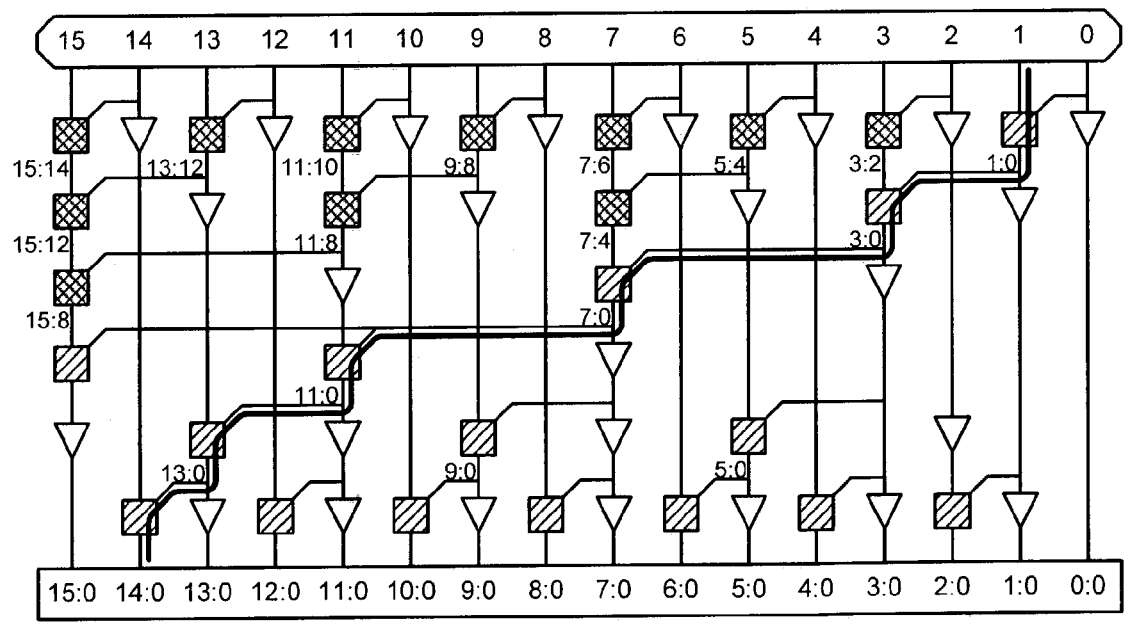
FIG. 2E illustrates another Ladner-Fischer prefix network.
Figure 2F:
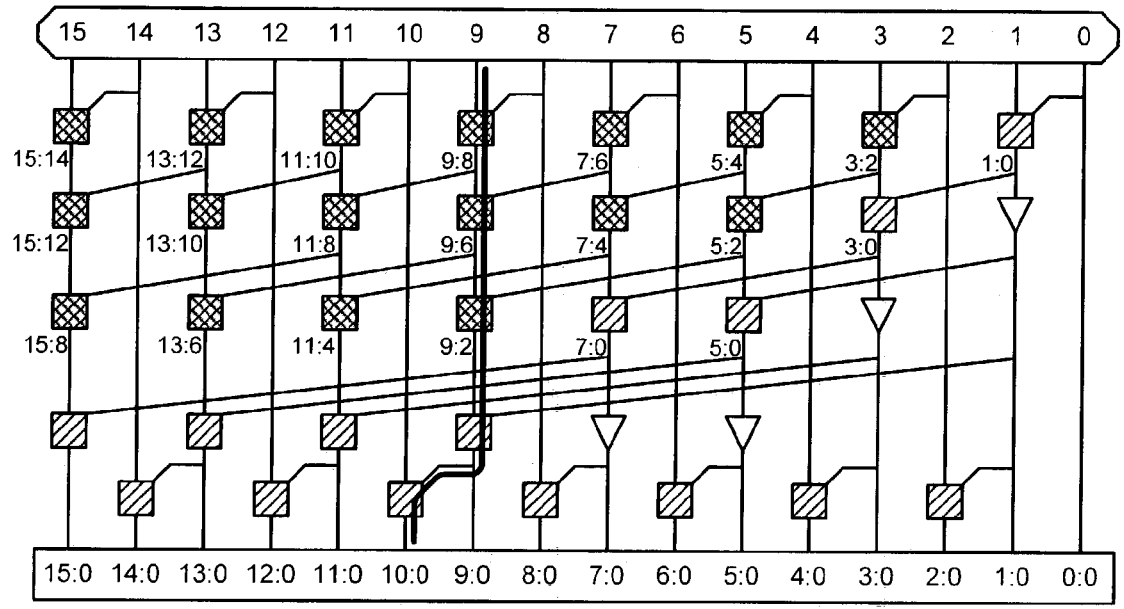
FIG. 2F illustrates a Han-Carlson prefix network.
Figure 2G:
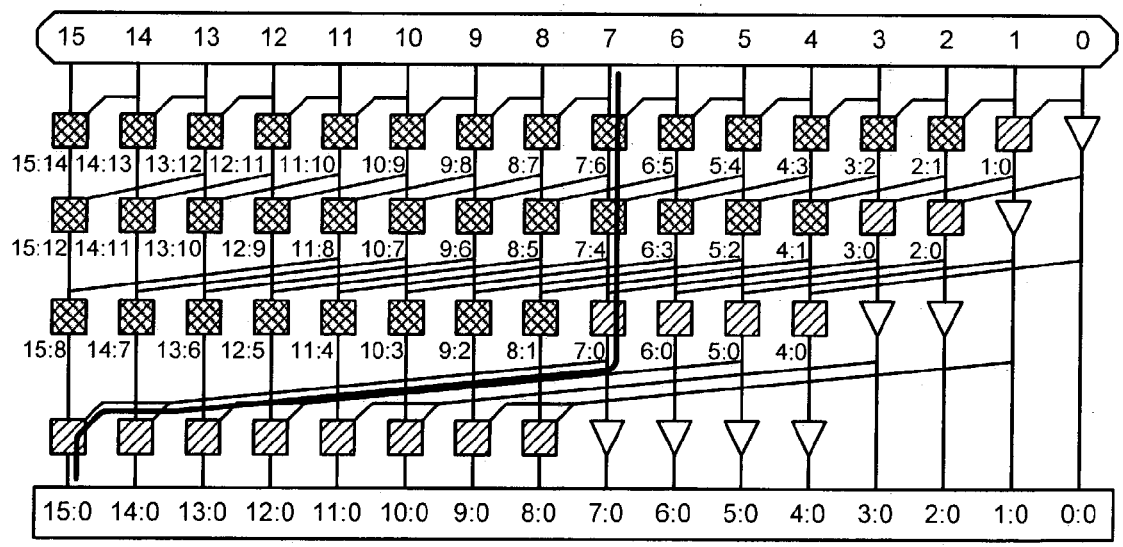
FIG. 2G illustrates a Knowles prefix network.

Knowles networks are described by L integers specifying the fanout at each stage. For example, the [8,4,2,1] and [1,1,1,1] networks represent the Sklansky and Kogge-Stone extremes, respectively, and the [2,1,1,1] Knowles network is illustrated in FIG. 2G. In general, a (0, f, t) network corresponds to, the Knowles network $[2^f, 2^{f-1}, \ldots, 1, 1]$, which is the Knowles network closest to the diagonal.

New Parallel Prefix Networks

The above-described taxonomy suggests that there exists more parallel prefix networks. Note that the parallel prefix networks occupy places where the l+f+t=L−1 plane intersects the cube. The Sklansky, Brent-Kung, and Kogge-Stone networks lie at the vertices of the cube. The Ladner-Fischer, Han-Carlson, and Knowles networks occupy the diagonals of each face. However, there is an entirely new class of networks inside the cube, occupying locations where l, f, t>0. Like Knowles, this class requires propagate be defined with OR for addition.

Figure 4:
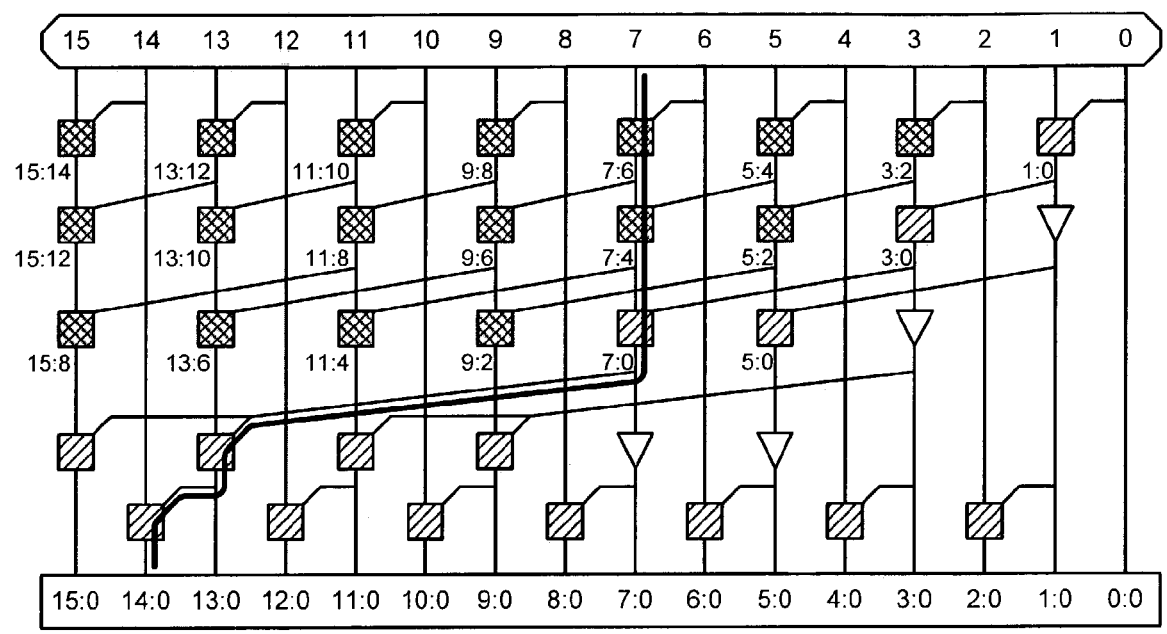
FIG. 4 illustrates a new 16-bit prefix network, wherein (l,f,t)=(1,1,1) in accordance with an embodiment of the present invention.
Figure 5C:
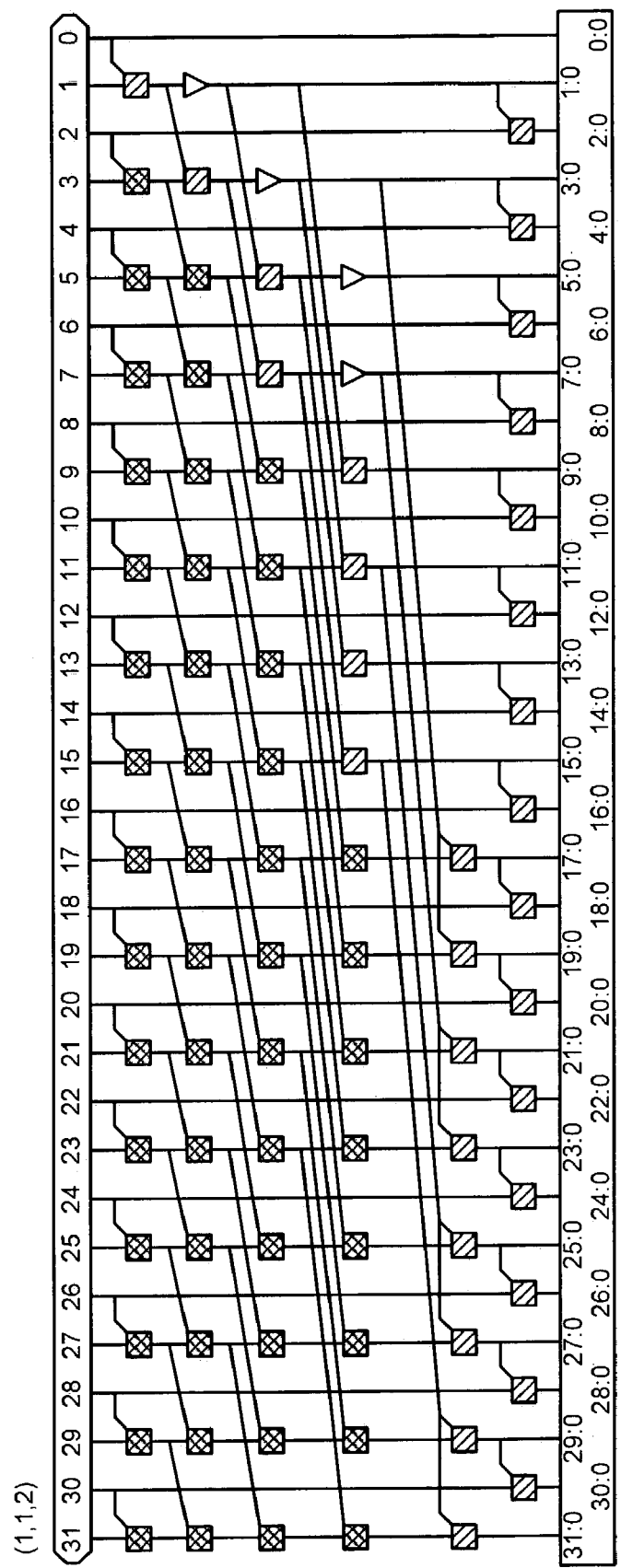
FIG. 5C illustrates a new 32-bit prefix network, wherein (l,f,t)=(1,1,2) in accordance with an embodiment of the present invention.

For example, FIG. 4 illustrates a 16-bit network, wherein (l,f,t)=(1,1,1). FIGS. 5A–5C illustrate 32-bit networks, wherein (l,f,t)=(1,1,2), (1,2,1), and (2,1,1), respectively.

Comparisons

Table 1 compares some of the parallel prefix networks under consideration.

number of tightly spaced wiring tracks. Note that extra gates called "helpers" can be wired in parallel to drive large loads.

The method of logical effort can be used to estimate the latency adders built with each prefix network (see I. Sutherland, R. Sproul, and D. Harris, *Logical Effort*, San Francisco: Morgan Kaufmann Publishers, 1999.). Tables 2 through 4 present these estimates illustrating how latency for different prefix networks depends on adder size, circuit family, and wire capacitance, respectively.

TABLE 2

Adder delays: w = 0.5; inverting static CMOS/footed domino

|  | N = 16 | N = 32 | N = 64 | N = 128 |
|---|---|---|---|---|
| Brent-Kung | 10.4/9.9 | 13.7/13.0 | 18.1/17.4 | 24.9/24.2 |
| Sklansky | 13.0/8.8 | 21.6/12.4 | 38.2/18.3 | 70.8/28.2 |
| Kogge-Stone | 9.4/7.4 | 12.4/10.0 | 17.0/14.1 | 24.8/21.5 |
| Han-Carlson | 9.9/7.7 | 12.1/9.4 | 15.1/12.0 | 19.7/16.1 |
| Knowles [2, 1, . . ., 1] | 9.7/7.9 | 12.7/10.3 | 17.3/14.5 | 25.1/21.8 |
| Ladner-Fischer (L-2, 1, 0) | 9.9/9.0 | 12.9/12.0 | 16.9/16.0 | 22.9/21.9 |
| Ladner-Fischer (1, L-2, 0) | 10.6/8.4 | 15.2/10.8 | 23.8/14.5 | 40.4/20.3 |
| Ladner-Fischer (1, L-2, 0) w/helpers | 9.7/8.0 | 11.6/9.5 | 13.8/11.1 | 16.2/12.0 |
| (1, 1, L-3) | 10.7/8.1 | 12.9/9.8 | 15.9/12.4 | 20.5/16.5 |

TABLE 3

Adder delays: w = 0.5; N = 32/64

|  | Inverting Static CMOS | Noninverting Static CMOS | Footed Domino | Unfooted Domino |
|---|---|---|---|---|
| Brent-Kung | 13.7/18.1 | 16.8/21.8 | 13.0/17.4 | 10.7/14.6 |
| Sklansky | 21.6/38.2 | 16.3/23.4 | 12.4/18.3 | 10.5/15.9 |
| Kogge-Stone | 12.4/17.0 | 13.4/18.0 | 10.0/14.1 | 8.7/12.7 |
| Han-Carlson | 12.1/15.1 | 13.3/16.4 | 9.4/12.0 | 7.9/10.3 |
| Knowles [2, 1, . . ., 1] | 12.7/17.3 | 13.6/18.3 | 10.3/14.5 | 8.9/12.9 |
| Ladner-Fischer (L-2, 1, 0) | 12.9/16.9 | 15.6/20.2 | 12.0/16.0 | 9.8/13.3 |
| Ladner-Fischer (L-2, 1, 0) | 15.2/23.8 | 14.5/19.1 | 10.8/14.5 | 8.9/12.1 |
| Ladner-Fischer (1, L-2, 0) w/helpers | 11.6/13.8 | 12.9/15.0 | 9.5/11.1 | 7.7/9.1 |

TABLE 1

| Architecture | Classification | Logic Levels | Max Fanout | Tracks | Cols |
|---|---|---|---|---|---|
| Brent-Kung | (L-1, 0, 0) | L + (L − 1) | 2 | 1 | N/2 |
| Sklansky | (0, L-1, 0) | L | N/2 + 1 | 1 | N |
| Kogge-Stone | (0, 0, L-1) | L | 2 | N/2 | N |
| Han-Carlson | (1, 0, L-2) | L + 1 | 2 | N/4 | N/2 |
| Knowles [2,1, . . ., 1] | (0, 1, L-2) | L | 3 | N/4 | N |
| Ladner-Fischer | (L-2, 1, 0) | L + (L − 2) | 3 | 1 | N/2 |
| Ladner-Fischer | (1, L-2, 0) | L + 1 | N/4 + 1 | 1 | N/2 |
| Ladner-Fischer + helpers | (1, L-2, 0) | L + 1 | N/4 + 1 + helpers | 2 | N/2 |
| (1, 1, L-3) | (1, 1, L-3) | L + 1 | 3 | N/8 | N/2 |

The delay through each network depends on the number of logic levels, the fanout, and the wire capacitance. All prefix cells are designed to have the same drive capability; this drive is arbitrary and generally greater than minimum. The wire capacitance depends on layout and process, and can be expressed by w, the ratio of wire capacitance per column traversed to input capacitance of a unit inverter. Reasonable estimates from a trial layout in a 180 nm process are w=0.5 for widely spaced tracks and w=1 for networks with a large TABLE 3-continued Adder delays: w = 0.5; N = 32/64

|  | Inverting Static CMOS | Noninverting Static CMOS | Footed Domino | Unfooted Domino |
|---|---|---|---|---|
| (1, 1, L-3) | 12.9/15.9 | 13.8/16.9 | 9.8/12.4 | 8.3/10.6 |

TABLE 4

Adder delays: inverting static CMOS; N = 32/64

| | w = 0 | w = 0.25 | w = 0.5 | w = 0.75 | w = 1 |
|---|---|---|---|---|---|
| Brent-Kung | 11.4/13.4 | 12.5/15.7 | 13.7/18.1 | 14.8/20.4 | 15.9/22.7 |
| Sklansky | 18.5/31.9 | 20.1/35.0 | 21.6/38.2 | 23.1/41.4 | 24.7/44.5 |
| Kogge-Stone | 9.3/10.7 | 10.9/13.9 | 12.4/17.0 | 13.9/20.1 | 15.5/23.3 |
| Han-Carlson | 10.5/11.9 | 11.3/13.5 | 12.1/15.1 | 12.9/16.7 | 13.7/18.3 |
| Knowles [2, 1, ..., 1] | 9.6/11.0 | 11.2/14.2 | 12.7/17.3 | 14.3/20.4 | 15.8/23.6 |
| Ladner-Fischer (L-2, 1, 0) | 11.1/13.1 | 12.0/15.0 | 12.9/16.9 | 13.9/18.9 | 14.8/20.8 |
| Ladner-Fischer (1, L-2, 0) | 13.6/20.6 | 14.4/22.2 | 15.2/23.8 | 16.0/25.4 | 16.8/27.0 |
| Ladner-Fischer (1, L-2, 0) + helpers | 10.7/12.6 | 11.2/13.2 | 11.6/13.8 | 12.1/14.5 | 12.6/15.1 |
| (1, 1, L-3) | 11.2/12.6 | 12.1/14.3 | 12.9/15.9 | 13.8/17.6 | 14.6/19.2 |

Recursive Network Construction

Figure 1:
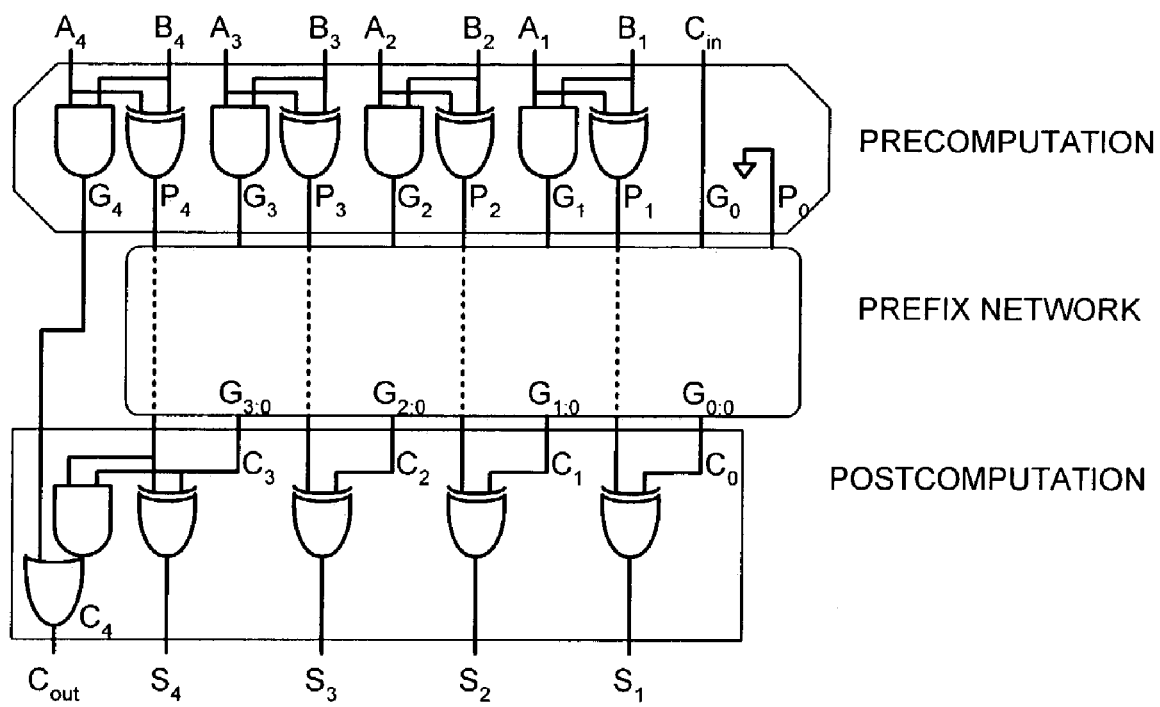
FIG. 1 illustrates a four-bit adder.
Figure 6:
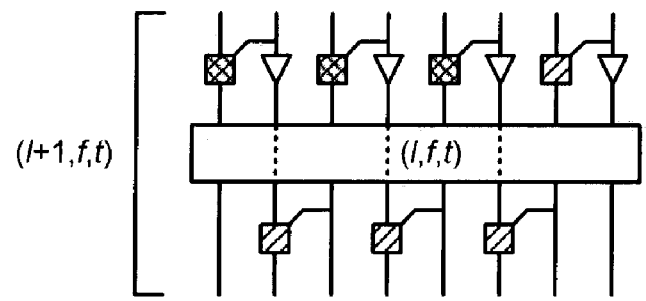
FIG. 6 illustrates recursive construction of a parallel prefix network in accordance with an embodiment of the present invention.

Note that it is possible to recursively construct parallel prefix networks. We begin with a (0, f, t) Knowles network constructed using the technique described in [K01]. Given an (l, f, t) N-bit network, FIG. 6 shows how to recursively construct a 2N-bit (l+1, f, t) network. It illustrates the particular case of N=4, but the technique readily generalizes. Indeed, this approach may be applied to any of the Knowles networks described in [K01]. Beginning with an N-bit Knowles network with log N stages, one can form a $2^l$N-bit network with 2l+log N stages by applying the recursion l times.

Higher Valencies

Note that although this disclosure discusses valency-2 prefix operations (i.e. those that use 2-input associative operators), the results readily generalize to higher valency networks that combine more than two signals at each prefix cell (see A. Beaumont-Smith and C. Lim, "Parallel prefix adder design," *Proc. 15th IEEE Symp. Comp. Arith*, pp. 218–225, June 2001.)

A similar taxonomy can be constructed for these higher valency networks. In general, an N-bit valency-v network requires $L=\log_v N$ stages. It may still be described by (l,f,t) such that l+f+t=L-1. The network has the following properties:

Logic Levels: L+l

Fanout: $(v-1)v^f+1$

Wiring Tracks: $(v-1)v^t$

For example, an 81-bit valency-3 (1,1,1) network can be constructed using 5 logic levels with a maximum fanout of 7 and a maximum of 6 wiring tracks between levels. Networks can also have mixed valency (e.g. a 16-bit adder could use a valency-4 first stage followed by two valency-2 stages). The extension of the taxonomy to mixed valencies should be apparent to anyone of ordinary skill in the art.

Ling Networks

It is sometimes possible to save a level of logic by merging the precomputation into the first stage of the prefix network. A common example is the Ling adder built in bipolar logic, although this technique can also be applied to dynamic CMOS logic. (see H. Ling, "High-speed binary adder," *IBM J. Research and Development*, vol. 25, no. 3, pp. 155–166, May 1981.) A merged prefix network of this type may still be classified based on its structure ignoring the merged precomputation.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A circuit that performs a prefix computation, comprising:
   an N-bit prefix network comprised of prefix cells arranged into L+l logic levels, wherein N is greater than 8 and an integral power of two, and wherein $L=\log_2 N$;
   wherein the N-bit prefix network computes N outputs $\{Y_N, \ldots, Y_1\}$ from N inputs $\{X_N, \ldots, X_1\}$ using an associative two-input operator $\circ$, such that $Y_1=X_1$, $Y_2=X_2 \circ X_1$, $Y_3=X_3 \circ X_2 \circ X_1$, . . . , $Y_N=X_N \circ X_{N-1} \circ \ldots \circ X_2 \circ X_1$,
   wherein each prefix cell has a fanout of at most $2^f+1$; and
   wherein there are at most $2^t$ horizontal wiring tracks between each logic level;
   wherein l+f+t=L-1; and
   wherein l>0, f>0, and t>0.

2. The circuit of claim 1, wherein the N-bit prefix network functions as part of one of:
   an adder;
   a subtracter;
   a magnitude comparator;
   a priority encoder; and
   a circuit that finds the first two ones in an N-bit input.

3. The circuit of claim 1,
   wherein the N-bit prefix network functions as part of a 16-bit adder; and
   wherein (l,f,t)=(1,1,1).

4. The circuit of claim 1,
   wherein the N-bit prefix network functions as part of a 32-bit adder; and
   wherein (l,f,t)=(2,1,1), (1,2,1) or (2,1,1).

5. The circuit of claim 1,
   wherein the N-bit prefix network functions as part of a 64-bit adder; and
   wherein (l,f,t)=(1,1,3), (1,2,2), (1,3,1), (2,1,2), (2,2,1) or (3,1,1).

6. The circuit of claim 1,
   wherein the N-bit prefix network functions as part of a 128-bit adder; and
   wherein (l,f,t)=(1,1,4), (1,2,3), (1,3,2), (1,4,1), (2,1,3), (2,2,2), (2,3,1), (3,1,2), (3,2,1) or (4,1,1).

7. The circuit of claim 1, wherein precomputation operations are merged into the N-bit prefix network.

8. The circuit of claim 1,
   wherein the N-bit (l,f,t) prefix network is formed from an M-bit (0,f,t) Knowles networks by adding l stages before and after the M-bit Knowles networks;
   wherein $N=2^l M$; and
   wherein the N-bit prefix network has 2l+logM stages.

9. The circuit of claim 1, wherein logic levels in the N-bit prefix network include:
   prefix cells that perform prefix operations; and
   buffers that reduce loading for subsequent logic levels.

10. A circuit that performs a prefix computation, comprising:

an N-bit prefix network comprised of prefix cells arranged into L+1 logic levels, wherein N is greater than 8 and an integral power of two, and wherein $L=\log_2 N$;

wherein the N-bit prefix network computes N outputs $\{Y_N, \ldots, Y_1\}$ from N inputs $\{X_N, \ldots, X_1\}$ using an associative operator $\circ\bigcirc$, such that $Y_1=X_1$, $Y_2=X_2 \circ X_1$, $Y_3=X_3 \circ X_2 \circ X_1, \ldots, Y_N=X_N \circ X_{N-1} \circ \ldots \circ X_2 \circ X_1$;

wherein each prefix cell has a valency v and a fanout of at most $(v-1)v^f+1$; and wherein there are at most $(v-1)v^t$ horizontal wiring tracks between each logic level;

wherein $l+f+t=L-1$; and wherein $l>0, f>0$, and $t>0$.

11. The circuit of claim 10, wherein the valency v of each prefix cell is one of 2, 3 and 4.

12. The circuit of claim 10, wherein the valency v of each prefix cell is 3;

wherein the N-bit prefix network functions as part of an 81-bit adder; and wherein $(l,f,t)=(1,1,)$.

13. The circuit of claim 10 wherein the N-bit prefix network includes prefix cells with different valencies.

14. A computer system including a circuit that performs a prefix computation, comprising:

a processor;

a memory;

a functional unit within the processor;

an N-bit prefix network within the functional unit comprised of prefix cells arranged into L+1 logic levels, wherein N is greater than 8 and an integral power of two, and wherein $L=\log_2 N$;

wherein the N-bit prefix network computes N outputs $\{Y_N, \ldots, Y_1\}$ from N inputs $\{X_N, \ldots, X_1\}$ using an associative two-input operator $\circ\bigcirc$, such that $Y_1=X_1$, $Y_2=X_2 \circ X_1$, $Y_3=X_3 \circ X_2 \circ X_1, \ldots, Y_N=X_N \circ X_{N-1} \circ \ldots \circ X_2 \circ X_1$;

wherein each prefix cell has a fanout of at most $2^f+1$; and wherein there are at most $2^t$ horizontal wiring tracks between each logic level;

wherein $l+f+t=L-1$; and wherein $l>0, f>0$, and $t>0$.

15. The computer system of claim 14, wherein the N-bit prefix network functions as part of one of:

an adder;

a subtracter;

a magnitude comparator;

a priority encoder; and a circuit that finds the first two ones in an N-bit input.

16. The computer system of claim 14, wherein the N-bit prefix network functions as part of a 16-bit adder; and wherein $(l,f,t)=(1,1,1)$.

17. The computer system of claim 14, wherein the N-bit prefix network functions as part of a 32-bit adder; and wherein $(l,f,t)=(2,1,1)$, $(1,2,1)$ or $(2,1,1)$.

18. The computer system of claim 14, wherein the N-bit prefix network functions as part of a 64-bit adder; and wherein $(l,f,t)=(1,1,3)$, $(1,2,2)$, $(1,3,1)$, $(2,1,2)$, $(2,2,1)$ or $(3,1,1)$.

19. The computer system of claim 14, wherein the N-bit prefix network functions as part of a 128-bit adder; and wherein $(l,f,t)=(1,1,4)$, $(1,2,3)$, $(1,3,2)$, $(1,4,1)$, $(2,1,3)$, $(2,2,2)$, $(2,3,1)$, $(3,1,2)$, $(3,2,1)$ or $(4,1,1)$.

20. The computer system of claim 14, wherein precomputation operations are merged into the N-bit prefix network.

21. The computer system of claim 14, wherein the N-bit (l,f,t) prefix-network is formed from an M-bit (0, f, t) Knowles network by adding l stages before and after the M-bit Knowles network;

wherein $N=2^l M$; and wherein the N-bit prefix network has $2l+\log M$ stages.

22. The computer system of claim 14, wherein logic levels in the N-bit prefix network include:

prefix cells that perform prefix operations; and buffers that reduce loading for subsequent logic levels.

23. A computer system including a circuit that performs a prefix computation, comprising:

a processor;

a memory;

an functional unit within the processor;

an N-bit prefix network within the functional unit comprised of prefix cells arranged into L+1 logic levels, wherein N is greater than 8 and an integral power of two, and wherein $L=\log_2 N$;

wherein the N-bit prefix network computes N outputs $\{Y_N, \ldots, Y_1\}$ from N inputs $\{X_N, \ldots, X_1\}$ using an associative operator $\circ\bigcirc$, such that $Y_1=X_1$, $Y_2=X_2 \circ X_1$, $Y_3=X_3 \circ X_2 \circ X_1, \ldots, Y_N=X_N \circ X_{N-1} \circ \ldots \circ X_2 \circ X_1$;

wherein each prefix cell has a valency v and a fanout of at most $(v-1)v^f+1$; and wherein there are at most $(v-1)v^t$ horizontal wiring tracks between each logic level;

wherein $l+f+t=L-1$; and wherein $l>0, f>0$, and $t>0$.

24. The computer system of claim 23, wherein the valency v of each prefix cell is one of 2, 3 and 4.

25. The computer system of claim 23, wherein the valency v of each prefix cell is 3;

wherein the N-bit prefix network functions as part of an 81-bit adder; and wherein $(l,f,t)=(1,1,1)$.

26. The computer system of claim 23, wherein the N-bit prefix network includes prefix cells with different valencies.

* * * * *

UNITED STATES PATENT AND TRADEMARK OFFICE
CERTIFICATE OF CORRECTION

| | | |
|---|---|---|
| PATENT NO. | : 7,152,089 B2 | Page 1 of 1 |
| APPLICATION NO. | : 10/431036 | |
| DATED | : December 19, 2006 | |
| INVENTOR(S) | : Daniel ManHung Wong | |

It is certified that error appears in the above-identified patent and that said Letters Patent is hereby corrected as shown below:

In claim 12 (at column 9, line 21), please delete the equation, "(1,f,t)=(1,1,)" and replace with the equation --(1,f,t)=(1,1,1)--.

Signed and Sealed this

Sixth Day of March, 2007

JON W. DUDAS
*Director of the United States Patent and Trademark Office*